US009944294B2

(12) United States Patent
Takaso (10) Patent No.: US 9,944,294 B2
(45) Date of Patent: Apr. 17, 2018

(54) VEHICLE TRAVELING CONTROL APPARATUS

(71) Applicant: SUBARU CORPORATION, Tokyo (JP)

(72) Inventor: Yasushi Takaso, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/171,602

(22) Filed: Jun. 2, 2016

(65) Prior Publication Data

US 2016/0362113 A1 Dec. 15, 2016

(30) Foreign Application Priority Data

Jun. 10, 2015 (JP) ................................. 2015-117705

(51) Int. Cl.
*B60W 40/08* (2012.01)
*G05D 1/02* (2006.01)
(Continued)

(52) U.S. Cl.
CPC ............ *B60W 40/08* (2013.01); *B60W 10/18* (2013.01); *B60W 10/20* (2013.01); *G05D 1/0055* (2013.01);
(Continued)

(58) Field of Classification Search
CPC ...... B60W 40/08; B60W 10/20; B60W 10/18; B60W 2540/22; B60W 2540/18;
(Continued)

(56) References Cited

U.S. PATENT DOCUMENTS 9,308,914 B1 *  4/2016  Sun ....................... B60K 28/06
2011/0241862 A1 * 10/2011  Debouk .............. B60W 50/035
                                                    340/439

(Continued)

FOREIGN PATENT DOCUMENTS

JP    2000-276690 A    10/2000
JP    2014-044707 A     3/2014
WO    2013/008299 A1    1/2013

OTHER PUBLICATIONS

Notification of Reasons for Refusal issued in corresponding Japanese Patent Application No. 2015-117705, dated Sep. 20, 2016.

*Primary Examiner* — Anne M Antonucci
(74) *Attorney, Agent, or Firm* — McDermott Will & Emery LLP (57) ABSTRACT

A vehicle traveling control apparatus includes a first information obtaining unit, a second information obtaining unit, a traveling controller, a detector, and a calculator. The first information obtaining unit obtains information on a traveling environment of an own vehicle as traveling environment information. The second information obtaining unit obtains information on traveling of the own vehicle as traveling information. The traveling controller performs an evacuation traveling control, based on the traveling environment information and the traveling information. The evacuation traveling control causes an evacuation traveling of the own vehicle to be executed. The detector detects an abnormal state of a driver of the own vehicle. The calculator calculates waiting time during which waiting is performed from the detection of the abnormal state of the driver to starting of the evacuation traveling control, when the abnormal state of the driver is detected by the detector.

18 Claims, 4 Drawing Sheets

(51) Int. Cl.
*B60W 10/18* (2012.01)
*B60W 10/20* (2006.01)
*G05D 1/00* (2006.01)

(52) U.S. Cl.
CPC ......... *G05D 1/0246* (2013.01); *G05D 1/0255* (2013.01); *G05D 1/0257* (2013.01); *B60W 2540/18* (2013.01); *B60W 2540/22* (2013.01); *B60W 2550/10* (2013.01); *B60W 2720/24* (2013.01); *B60W 2750/40* (2013.01); *G05D 2201/0213* (2013.01)

(58) Field of Classification Search
CPC ......... B60W 2750/40; B60W 2720/24; B60W 2550/10; G05D 1/055; G05D 1/0255; G05D 1/0246; G05D 1/0257; G05D 2201/0213
See application file for complete search history.

(56) References Cited

U.S. PATENT DOCUMENTS

2012/0025993 A1* 2/2012 Akiyama ................ A61B 5/18
340/576
2013/0018549 A1 1/2013 Kobana et al.

\* cited by examiner

VEHICLE TRAVELING CONTROL APPARATUS

CROSS-REFERENCE TO RELATED APPLICATIONS

The present application claims priority from Japanese Patent Application No. 2015-117705 filed on Jun. 10, 2015, the entire contents of which are hereby incorporated by reference.

BACKGROUND

The technology relates to a vehicle traveling control apparatus that performs an evacuation traveling control of an own vehicle under, for example but not limited to, an abnormal situation.

In recent years, various proposals and developments directed to utilization of an automatic driving technique have been made on vehicles to allow drivers to drive more comfortably. For example, Japanese Unexamined Patent Application Publication (JP-A) No. 2000-276690 discloses a technique on an automatic driving controller in which a switchover from an automatic driving mode to a manual driving mode is performed when an override carried out by a driver is detected after a notification that the switching of the driving modes is performed. When the override is not detected after the notification, the automatic driving mode is continued to guide a traveling vehicle to an emergency evacuation road as a safety area. The emergency evacuation road is provided separately from a general road that is branched from a main road.

SUMMARY

In general, what is desired in an automatic driving control is a vehicle traveling control technique that makes it possible to achieve proper evacuation traveling.

It is desirable to provide a vehicle traveling control apparatus that makes it possible to achieve proper evacuation traveling.

An aspect of the technology provides a vehicle traveling control apparatus that includes: a first information obtaining unit that obtains information on a traveling environment of an own vehicle as traveling environment information; a second information obtaining unit that obtains information on traveling of the own vehicle as traveling information; a traveling controller that performs an evacuation traveling control, based on the traveling environment information and the traveling information, in which the evacuation traveling control causes an evacuation traveling of the own vehicle to be executed; a detector that detects an abnormal state of a driver of the own vehicle; and a calculator that calculates waiting time during which waiting is performed from the detection of the abnormal state of the driver to starting of the evacuation traveling control, when the abnormal state of the driver is detected by the detector.

BRIEF DESCRIPTION OF THE DRAWINGS

FIGS. 4A to 4D are time charts that describe the evacuation control according to the implementation of the technology, in which

DETAILED DESCRIPTION

In the following, some implementations of the technology are described in detail with reference to the accompanying drawings.

A technique of an automatic driving control disclosed in JP-A No. 2000-276690 may be employed to allow for evacuation traveling of a vehicle to a safe place, such as the shoulder, to stop the vehicle to the safe place following detection of abnormality of a driver. However, when a member that detects an abnormal state of the driver, including a switch and a sensor without limitation, erroneously detects the abnormality of the driver, the vehicle may start the evacuation traveling on the basis of the erroneous detection performed by the member even though the driver is not in the abnormal state. Such an automatic driving control may thus turn out to be a vehicle system that may trouble surrounding vehicles and passersby. Further, the technique of the automatic driving control disclosed in JP-A No. 2000-276690 allows for a control that gives priority to manual driving by the driver when an override is carried out by the driver while the evacuation traveling by means of automatic driving is performed. However, this may permit execution of the manual driving under a situation where the driver is unable to make a normal determination, which may in turn prevent the abnormal state of the driver from being addressed properly.

It is desirable to provide a vehicle traveling control apparatus that makes it possible to prevent execution of unnecessary evacuation traveling even when a member that detects an abnormal state of a driver, including a switch and a sensor without limitation, erroneously detects abnormality of the driver, and thereby to perform proper evacuation traveling that takes driving performed by the driver into consideration.

Figure 1:
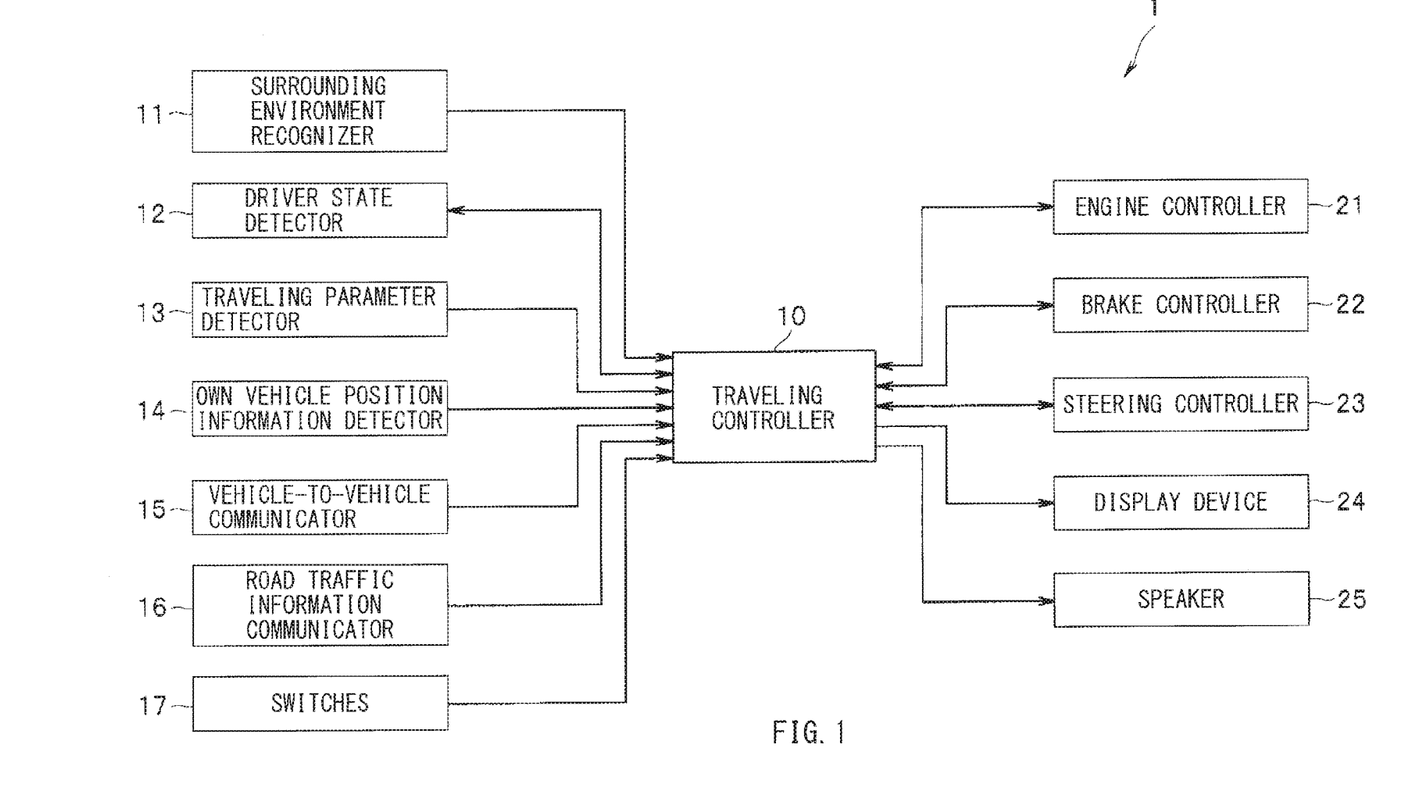
FIG. 1 illustrates an overall configuration of a vehicle traveling control apparatus according to an implementation of the technology.

Referring to FIG. 1, a vehicle traveling control apparatus 1 may include a traveling controller 10. The vehicle traveling control apparatus 1 may include, as input devices, a surrounding environment recognizer 11, a driver state detector 12, a traveling parameter detector 13, an own vehicle position information detector 14, a vehicle-to-vehicle communicator 15, a road traffic information communicator 16, and switches 17. The vehicle traveling control apparatus 1 may include, as output devices, an engine controller 21, a brake controller 22, a steering controller 23, a display device 24, and a speaker 25. The speaker 25 as used herein encompass a buzzer. The input devices and the output devices may be coupled to the traveling controller 10.

The surrounding environment recognizer 11 may include a camera and a reflected wave receiver which are unillustrated. The camera may have a solid-state imaging device, etc. The camera may be provided in a vehicle interior, and may capture an image of an environment outside a vehicle to obtain image information. The camera may be, for example but not limited to, a stereo camera, a monocular camera, or a color camera. The reflected wave receiver may be one or both of, for example but not limited to, a radar and a sonar. The radar and the sonar each may receive a reflected wave derived from a three-dimensional object present around the vehicle. The radar may be, for example but not limited to, a laser radar or a millimeter-wave radar.

The surrounding environment recognizer 11 may perform, for example but not limited to, a grouping process on distance information, based on the image information obtained by the camera. The surrounding environment recognizer 11 may then compare the distance information having been subjected to the grouping process with three-dimensional road shape data, three-dimensional object data, etc., which are set in advance. By making the comparison, surrounding environment recognizer 11 may extract, for example but not limited to, data on lane division line, data on sidewall present along a road such as a guardrail and a curb, and the data on three-dimensional object such as a vehicle including a preceding vehicle, an oncoming vehicle, a vehicle running parallel to the own vehicle, and a parked vehicle. The surrounding environment recognizer 11 may extract the pieces of data, together with a position relative to the own vehicle and a speed. The relative position may include, for example but not limited to, a distance and an angle.

The surrounding environment recognizer 11 may further calculate reliability of information on a traveling environment, based on an abundance of a characteristic amount, arranged linearly in an image captured by the camera, of the lane division line (e.g., a lane line). The lane division line is present in process areas, and is determined among lane lines in the image. The abundance of the characteristic amount of the lane line where the ideal linear solid lane line is present in the areas is set to 1 (one), whereas the abundance may be determined as 0 (zero) in the complete absence of the characteristic amount or when the characteristic amount is not determinable as being arranged linearly. For example, the reliability of information on a forward environment may be determined as "high" when the reliability of equal to or greater than a previously-set threshold (such as, but not limited to, 0.8) is calculated, and may be determined as "low" when the reliability of less than the threshold is calculated. The surrounding environment recognizer 11 may output the reliability to the traveling controller 10 as well.

The surrounding environment recognizer 11 may also detect a position of a three-dimensional object from which the reflected wave is reflected, based on information on the reflected wave obtained from the radar or any other reflected wave receiver. The surrounding environment recognizer 11 may detect the position at which the three-dimensional object is present together with a speed. The position may include, for example but not limited to, a distance and an angle. In the implementation, without limitation, a maximum distance recognizable by the surrounding environment recognizer 11 may be defined as visibility. Non-limiting examples of the maximum distance may include a distance to the three-dimensional object and a farthest distance of the lane division line. In one implementation, the surrounding environment recognizer 11 may be provided as a first information obtaining unit.

The driver state detector 12 may detect eyesight and a behavior of a driver to detect a factor such as, but not limited to, the line of sight and a facing direction of the face of the driver. The driver state detector 12 may perform the detection, based on a detector such as, but not limited to, a visual field camera and an infrared lamp provided in the vehicle interior. The driver state detector 12 may make a determination, based on the detection, as to whether the factor, including the line of sight and the facing direction of the face, is out of a set range and whether the driver thus performs inattentive driving.

The driver state detector 12 may further detect a decrease in awakening degree of the driver, based on a detector such as, but not limited to, the visual field camera and the infrared lamp. Alternatively, the driver state detector 12 may detect the decrease in awakening degree by detecting an operation of a steering wheel, e.g., detecting a steering angle.

Further, the driver state detector 12 may also detect factors such as, but not limited to, a heart rate, a pulse waveform, a blood pressure, sweating, and a body temperature by means of biological sensors to compare values derived from the detection with, for example but not limited to, average values derived from past data of the individual driver. By making the comparison, the driver state detector 12 may make a determination as to whether a result of the comparison falls within a certain range to determine whether a condition of the driver is abnormal.

The driver state detector 12 may detect that the driver is in an abnormal state, where the awakening degree of the driver is low and where the condition of the driver is determined as being abnormal. Upon detecting that the driver is in the abnormal state, the more the presence of the inattentive driving performed by the driver and/or the lower the awakening degree, the lower a level of consciousness of the driver determined by the driver state detector 12 when there is the abnormality in the condition of the driver. The driver state detector 12 may output the determination on the level of consciousness to the traveling controller 10.

In one implementation, the driver state detector 12 may be provided as a detector.

The traveling parameter detector 13 may detect information on traveling of the own vehicle. The traveling information may include factors such as but not limited to, a vehicle speed V, a steering torque Tdrv, a steering angle $\theta H$, a yaw rate $\gamma$, an accelerator position, a throttle position, a gradient of a road surface on which the own vehicle travels, and an estimate on a friction coefficient of the road surface. In one implementation, the traveling parameter detector 13 may be provided as a second information obtaining unit.

The own vehicle position information detector 14 may be, for example but not limited to, a navigation system. The own vehicle position information detector 14 may receive an electric wave sent from, for example but not limited to, a global positioning system (GPS), and detect a current position, based on information on the received electric wave. By detecting the current position, the own vehicle position information detector 14 may identify a position of the own vehicle on map data. The map data may be stored in advance on a recording medium such as, but not limited to, a flash memory, a compact disc (CD), a digital versatile disc (DVD: Registered Trademark), a Blu-ray (Registered Trademark) disc, and a hard disk drive (HDD).

The map data stored in advance may include road data and facility data. The road data may include, for example but not limited to, information on positions of links, information on types of the links, information on positions of nodes, information on types of the nodes, and information on a relationship in connection between the nodes and the links. In other words, the road data may include information on branching and a junction of a road, information on a maximum vehicle speed at a branch road, and any other information. The facility data may include a plurality of records for each facility. The records each may include data that indicates, for example but not limited to, information on name of a relevant facility, information on a location of the facility, and information on a type of the facility which may be classified into a department store, a store, a restaurant, a parking lot, a park, and a place for repairing upon a vehicle malfunction. The own vehicle position information detector 14 may display the position of the own vehicle on the map, and allow an operator to input a destination. Upon the input of the destination, the own vehicle position information detector 14 may perform a predetermined calculation on a route from the place of departure to the destination. The own vehicle position information detector 14 may display the calculated route on the display device 24 such as, but not limited to, a display and a monitor, and may guide the driver by voice by means of the speaker 25 to allow for full command of guidance. In one implementation, the own vehicle position information detector 14 may be provided as the first information obtaining unit.

The vehicle-to-vehicle communicator 15 may be a short-range wireless communicator that may have a communication area of about 100 m such as, but not limited to, a wireless local area network (LAN). The vehicle-to-vehicle communicator 15 may perform communication with any other vehicle directly without any intervention of a server, etc., to transmit and receive information. The vehicle-to-vehicle communicator 15 may exchange information such as, but not limited to, vehicle information, traveling information, and traffic environment information with any other vehicle through the mutual communication with that vehicle. The vehicle information may include, for example but not limited to, unique information that indicates a type of a vehicle such as, but not limited to, a passenger car, a truck, and a motorcycle in one implementation. The traveling information may include, for example but not limited to, vehicle speed information, position information, information on lighting of a stop lamp, information on blinking of blinker upon right turn and left turn, and information on blinking of hazard lights upon emergency stop. The traffic environment information may include information subjected to change from situation to situation such as, but not limited to, information on traffic jam and information on construction. In one implementation, the vehicle-to-vehicle communicator 15 may be provided as the first information obtaining unit.

The road traffic information communicator 16 may be a so-called vehicle information and communication system (VICS: Registered Trademark) or any other suitable system that receives information on road traffic. The road traffic information communicator 16 may receive the road traffic information on a real-time basis through an FM multiplex broadcast or from a transmitter on a road, and display the received road traffic information on the previously-stored map data described above. The road traffic information may include information on, for example but not limited to, traffic jam, accident, construction, required time, and parking lot. In one implementation, the road traffic information communicator 16 may be provided as the first information obtaining unit.

The switches 17 may be those related to a driving support control for a driver. Non-limiting examples of the switches 17 may include: a switch that performs a constant speed traveling control in which a speed is set to a previously-set constant speed; a switch that performs a follow-up control in which an inter-vehicle distance or inter-vehicle time between the own vehicle and the preceding vehicle is kept to a previously-set constant value; a switch that performs a lane-keeping control in which a traveling lane is kept to a set lane to carry out a traveling control; a switch that performs a control which prevents an occurrence of deviation from the traveling lane, a switch that allows for execution of an overtaking control which overtakes the preceding vehicle or a vehicle to be overtaken; a switch that executes an automatic driving control which causes some or all of the controls described above to be performed in a coordinated manner; a switch that sets factors necessary for each of the controls described above, including a vehicle speed, an inter-vehicle distance, inter-vehicle time, and a speed limit without limitation; a switch that deactivates any or all of the controls described above. The switches 17 may further include an emergency switch that allows a driver himself/herself or a fellow passenger to perform an evacuation control when the driver is in the abnormal state. In one implementation, the switches 17 may be provided as the detector.

The engine controller 21 may perform a principal control related to an unillustrated engine of the vehicle, based on the vehicle information. The principal control may include, for example but not limited to, a fuel injection control, an ignition timing control, and an electronic throttle control. The vehicle information may be directed to, for example but not limited to, an intake airflow, a throttle position, an engine water temperature, an intake temperature, a concentration of oxygen, a crank angle, and an accelerator position.

The brake controller 22 may allow for a control of unillustrated brake devices of four wheels independently from a braking operation performed by the driver, and may perform a antilock brake system and a yaw moment control that applies a yaw moment to the vehicle. The brake controller 22 may perform these controls, based on the vehicle information that may be directed to, for example but not limited to, a brake switch, wheel speed of each of the four wheels, the steering angle θH, and the yaw rate γ. The yaw moment control, i.e., a yaw brake control, may include, for example but not limited to, an antiskid control. Upon receiving information on brake force of each wheel from the traveling controller 10, the brake controller 22 may calculate, based on the received brake force, braking fluid pressure to be applied to each wheel and activate an unillustrated brake driver.

The steering controller 23 may control assist torque derived from an unillustrated. electric power steering motor provided in a steering system of the vehicle, based on the vehicle information that may be directed to, for example but not limited to, the vehicle speed, the steering torque, the steering angle, and the yaw rate. The steering controller 23 may allow for the lane-keeping control in which the traveling lane is kept to the set lane to carry out the traveling control, the lane deviation prevention control that prevents the occurrence of deviation from the traveling lane, and the later-described evacuation control. The steering controller 23 may receive, from the traveling controller 10, information on the steering angle or the steering torque necessary for the lane-keeping control, the lane deviation prevention control, and the evacuation control calculated by the traveling controller 10, and may control driving of the electric power steering motor, based on a control amount of the steering angle or the steering torque received from the traveling controller 10. The steering angle necessary for the evacuation control may be referred to as an evacuation target steering angle θHt.

The display device 24 may provide, for the inside of the vehicle, the driver and the fellow passenger with visual alerting or visual notification, by means of for example but not limited to, the display, the monitor, or an alarm lamp. The display device 24 may provide, for the outside of the vehicle, surrounding vehicles and passersby with the visual alerting or the visual notification, by means of, for example but not limited to, hazard lights. For example, upon execution of the evacuation control following the detection of the abnormal state of the driver, for the inside of the vehicle, the display device 24 may visually notify the driver and the fellow passenger of starting of the evacuation control, from a time point at which the abnormal state of the driver is detected. The display device 24 may perform the visual alerting or the visual notification here by means of, tier example but not limited to, the display, the monitor, or the alarm lamp. The detection of the abnormal state of the driver may be determined as a result of the detection by the driver state detector 12 or turning on of the emergency switch of the switches 17. For the outside of the vehicle upon the execution of the evacuation control, the display device 24 may visually notify the surrounding vehicles, passersby, etc., of starting of evacuation traveling, from the starting of the evacuation traveling following an elapse of time of later-described waiting time. The display device 24 may perform the visual alerting or the visual notification here by means of, for example but not limited to, the hazard lights. In one implementation, the display device 24 may be provided both as a first notifier and a second notifier.

The speaker 25 may provide, for the inside of the vehicle, the driver and the fellow passenger with aural alerting or aural notification, by means of, for example but not limited to, previously-recorded voice. Likewise, the speaker 25 may provide, for the outside of the vehicle, the surrounding vehicles and the passersby with the aural alerting or the aural notification, by means of, for example but not limited to, the previously-recorded voice. For example, upon the execution of the evacuation control following the detection of the abnormal state of the driver, the speaker 25 may aurally notify the driver and the fellow passenger inside the vehicle as well as the surrounding vehicles and the passersby outside the vehicle of the execution of the evacuation control, from the time point at which the abnormal state of the driver is detected. The detection of the abnormal state of the driver may be determined as a result of the detection by the driver state detector 12 or the turning on of the emergency switch of the switches 17. The speaker 25 may perform the aural alerting or the aural notification by raising a voice alarm such as, but not limited to, "EMERGENCY EVACUATION ACTIVATED". In one implementation, the speaker 25 may be provided as a third notifier.

The traveling controller 10 may perform, based on input signals received from the respective devices 11 to 17 described above, the controls in a coordinated manner to execute the automatic driving control, etc. The controls may include, for example but not limited to, a collision prevention control that prevents the own vehicle from colliding with an obstacle, etc., the constant speed traveling control, the follow-up traveling control, the lane-keeping control, the lane deviation prevention control, and the overtaking control. When the abnormal state of the driver is detected upon the automatic driving control or a non-automatic driving control of the vehicle, a control performed by the traveling controller 10 may make a transition to the evacuation control described below with reference to a flowchart of FIG. 2. The detection of the abnormal state of the driver may be determined as a result of the detection by the driver state detector 12 or turning on of the emergency switch of the switches 17. In the evacuation control, the waiting time during which waiting is performed until the starting of the evacuation traveling may be calculated first, at least based on the level of consciousness of the driver. After the elapse of the waiting time, the evacuation traveling may be executed. Upon the execution of the evacuation control, the priority may be given to an override input performed by the driver when the override input is performed during the waiting time from the detection of the abnormal state of the driver to the starting of the evacuation traveling. However, when the override input is performed by the driver from the starting of the evacuation traveling following the elapse of the waiting time, the evacuation traveling may be executed by giving the priority to the evacuation traveling over the override input. In one implementation, the traveling controller 10 may be provided both as a traveling controller and a calculator.

Figure 2:
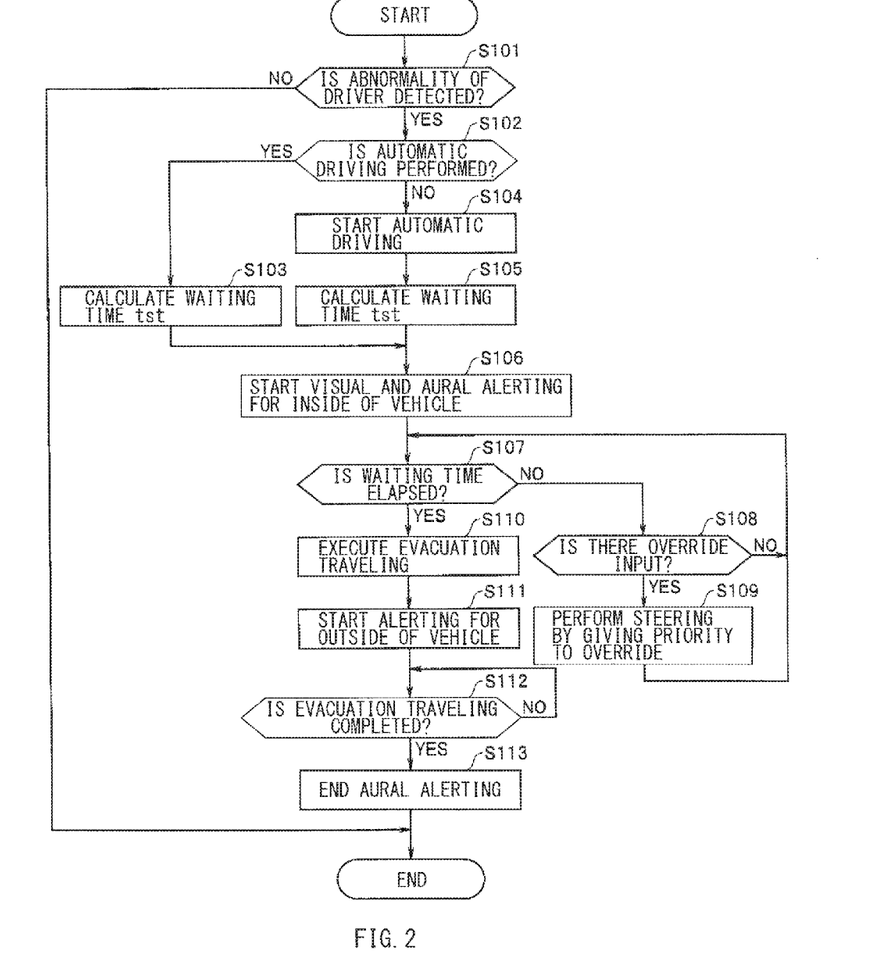
FIG. 2 illustrates a flowchart of a program of an evacuation control according to the implementation of the technology.

A description is given next, with reference to the flowchart of FIG. 2, of a program of the evacuation control to be executed by the traveling controller 10.

In step (hereinafter simply abbreviated as "S") 101, a determination is made as to whether the abnormal state of the driver is detected. The detection of the abnormal state of the driver may be determined as a result of the detection by the driver state detector 12 or turning on of the emergency switch of the switches 17. When a determination is made that the abnormal state of the driver is not detected, the program may end directly. The program may proceed to S102 when a determination is made that the abnormal state of the driver is detected.

In the S102, a determination is made as to whether automatic driving is performed. When a determination is made that the automatic driving is performed, the program may proceed to S103 where the waiting time tst may be calculated by, for example but not limited to, the following expression (1).

$$tst = ta - K1 \cdot tb \tag{1}$$

In the expression (1), "ta" denotes reference waiting time determined in advance by experiments, arithmetic operations, or other suitable methods. "tb" denotes unit time that decreases the reference waiting time ta and may be determined in advance by experiments, arithmetic operations, or other suitable methods. "K1" denotes a value set in accordance with the level of consciousness of the driver detected by the driver state detector 12. The more the presence of the inattentive driving performed by the driver and/or the lower the awakening degree, the lower the level of consciousness of the driver determined by the driver state detector 12 when there is the abnormality in the condition of the driver. As the level of consciousness becomes lower, K1 may be set to the larger value. Hence, as the level of consciousness becomes lower, the waiting time tst may become shorter, and the time until the starting of the evacuation traveling may be set to be shorter accordingly.

When a determination is made that the automatic driving is not performed in the S102, e.g., when manual driving is performed by the driver or when only the driving support control such as the lane-keeping control is performed, the program may proceed to S104 where the automatic driving is started.

Following the S104, the program may proceed to S105 where the waiting time tst may be calculated by, for example but not limited to, the following expression (2).

$$tst = ta - (K1 + K2 + K3 + K4) \cdot tb \tag{2}$$

In the expression (2), "K2" denotes a value set in accordance with the reliability of the traveling environment information necessary for the automatic driving. In one specific but non-limiting example, K2 may be set in accordance with the reliability of the image information obtained by the camera of the surrounding environment recognizer 11. As the reliability becomes higher, K2 may be set to the smaller value. Hence, as the reliability becomes higher, the waiting time tst may become longer, and the time until the starting of the evacuation traveling may be set to be longer accordingly.

Further, in the expression (2), "K3" denotes a value set in accordance with a surrounding environment. In one specific but non-limiting example, K3 may be set depending on the presence of the preceding vehicle or whether the own vehicle travels before the curve, and may be set to a small value when there is no preceding vehicle or when the own vehicle does not travel before the curve. Hence, the waiting time tst may be long when there is no preceding vehicle or when the own vehicle does not travel before the curve, and the time until the starting of the evacuation traveling may be set to be long accordingly.

Further, in the expression (2), "K4" denotes a value set in accordance with the traveling information such as, but not limited to, the vehicle speed V of the own vehicle. In one specific but non-limiting example, as the vehicle speed V becomes higher, K4 may be set to the larger value. Hence, as the vehicle speed V becomes higher, the waiting time tst may become shorter, and the time until the starting of the evacuation traveling may be set to be shorter accordingly.

Following the calculation of the waiting time tst in the S103 or the S105, the program may proceed to S106 where, for the inside of the vehicle, the provision of the visual alerting or the visual notification to the driver and the fellow passenger is started by means of, for example but not limited to, the display, the monitor, or the alarm lamp. The aural alerting or the aural notification may also be provided to the driver and the fellow passenger by means of, for example but not limited to, the previously-recorded voice. For the outside of the vehicle, the aural alerting or the aural notification may be provided to the surrounding vehicles and the passersby by means of, for example but not limited to, the previously-recorded voice.

The program may then proceed to S107 where a determination is made as to whether the waiting time tst is elapsed. When a determination is made that the waiting time tst is not elapsed, the program may proceed to S108 where a determination is made as to whether the override input is performed by the driver.

When a determination is made that the override input is performed by the driver as a result of the determination in the S108, the program may proceed to S109 where steering is performed by giving the priority to the override performed by the driver. Following the override-priority steering in the S109, the program may return to the S107. When a determination is made that the override input is not performed by the driver as a result of the determination in the S108, the program may return to the S107 directly.

When a determination is made that the waiting time tst is elapsed in the S107, the program may proceed to S110 where the evacuation traveling is executed.

Figure 3:
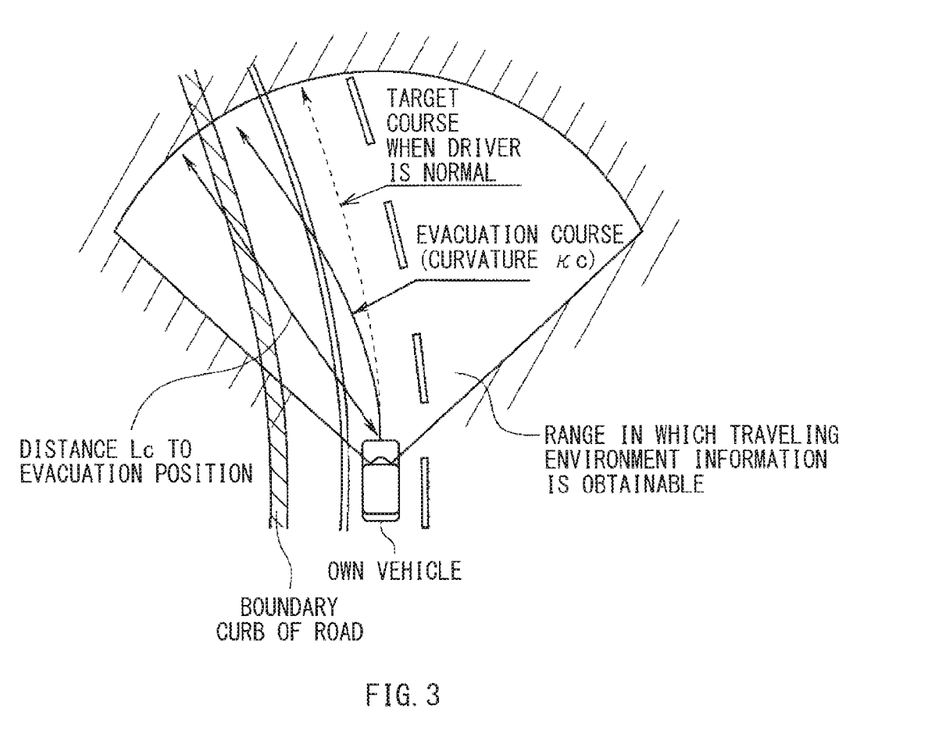
FIG. 3 describes an evacuation course to be set, according to the implementation of the technology.

Referring by way of example to FIG. 3, in the evacuation traveling, a course to a traveling position, i.e., an evacuation position, at which the vehicle is stoppable at the shoulder safely without causing the vehicle to be in contact with an obstacle may be set as an evacuation course within a range in which the traveling environment information is obtainable. Further, in the evacuation traveling, a curvature κc of the evacuation course may be calculated. The obstacle may include, for example but not limited to, a boundary curb of a road and a stopped vehicle. FIG. 3 illustrates a non-limiting example in which, where the vehicle is on the left-hand curve, a target course that follows along a road may be set as denoted by a dashed line in the drawing when the driver is not in the abnormal state, i.e., when the condition of the driver is normal. However, when the driver is in the abnormal state, the evacuation course that guides the vehicle to the shoulder located on the inner side of the curve may be set as denoted by a solid line in the figure. In FIG. 3, "Lc" denotes a distance from the own vehicle to the evacuation position.

The curvature κc of the evacuation course may be approximated by; for example but not limited to, representing the evacuation course on the two-dimensional coordinates and using a quadratic term coefficient, calculated from a quadratic least square method, with respect to points that constitute the evacuation course. The two-dimensional coordinates may be x-y coordinates where, for example, a front-back direction of the vehicle is defined as an x-direction and a lateral direction of the vehicle is defined as a y-direction. In a non-limiting example where the evacuation course is approximated by the quadratic expression: $y=a \cdot x^2 + b \cdot x + c$, a value of "$2 \cdot a$" may be approximated as a curvature component. Note that no obstacle or the like is illustrated in the example illustrated in FIG. 3. When the obstacle or the like is present on the shoulder, the evacuation course may be set within a distance from the own vehicle to a position before that obstacle.

Upon the setting of the evacuation course, evacuation target deceleration defined as "$(d^2x/dt^2)t$" may be calculated from, for example but not limited to, the following expression (3). The calculated evacuation target deceleration may be outputted to the brake controller 22.

$$(d^2x/dt^2)t = V0^2/(2 \cdot Lc) \quad (3)$$

In the expression (3), "V0" denotes a vehicle speed upon the starting of the evacuation traveling. The evacuation target deceleration $(d^2x/dt^2)t$ may be set to a larger deceleration value to ensure that the vehicle stops at the evacuation position.

Further, the evacuation target steering angle θHt necessary for the traveling along the set evacuation course may be calculated from, for example but not limited to, the following expression (4). The calculated evacuation target steering angle θHt may be outputted to the steering controller 23.

$$\theta Ht = (1 + A \cdot V^2) \cdot 1 \cdot n \cdot \kappa c \quad (4)$$

In the expression (4), "A" denotes a stability factor unique to a vehicle, "1" denotes a wheelbase, and "n" denotes a steering gear ratio. Note that during the execution of the evacuation traveling, the evacuation traveling is executed by giving the priority to the evacuation traveling even when the override input is performed by the driver.

Following the starting of the evacuation traveling in the S110, the program may proceed to S111 where the provision of the visual alerting or the visual notification to the surrounding vehicles and the passersby outside the vehicle is started by means of, for example but not limited to, the hazard lights.

The program may then proceed to S112 where a determination is made as to whether the evacuation traveling is completed, i.e., whether the vehicle is stopped at the evacuation position. The program may proceed to S113 after waiting is performed until the evacuation traveling completes and the evacuation traveling is thus completed. In the S113, the provision of the aural alerting or the aural notification to the surrounding vehicles and the passersby outside the vehicle is ended to end the program.

A description is given, with reference to time charts illustrated in FIGS. 4A to 4D, of a specific but non-limiting example of the evacuation control executed by the foregoing traveling controller 10.

In each of the time charts, no abnormal state of the driver is detected before a time point t0.

Figure 4A:
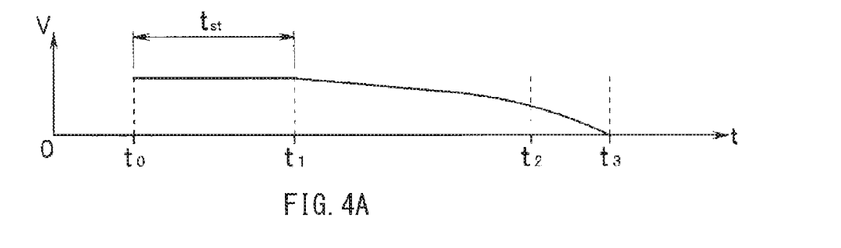
FIG. 4A illustrates a vehicle speed upon the evacuation control.
Figure 4B:
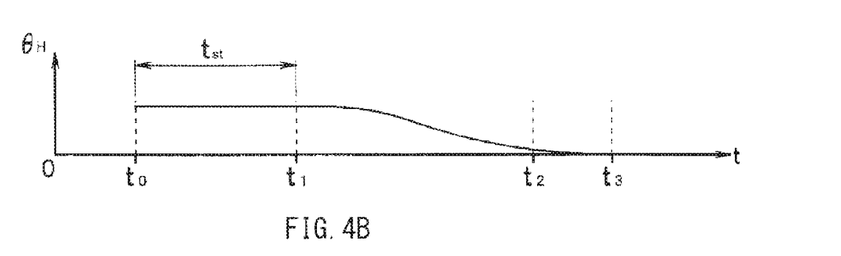
FIG. 4B illustrates a steering angle upon the evacuation control.
Figure 4C:
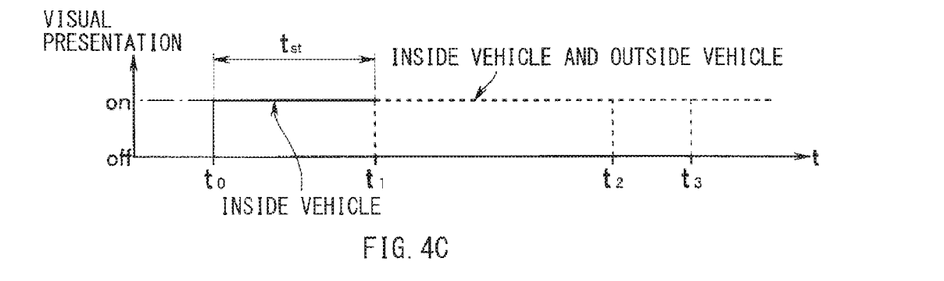
FIG. 4C illustrates a signal of each presentation upon the evacuation control.
Figure 4D:
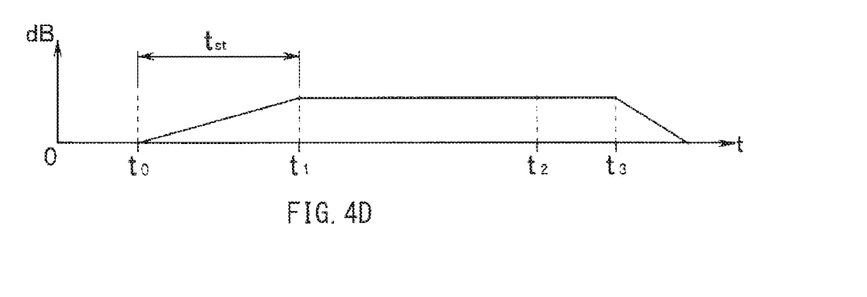
FIG. 4D illustrates an example of an aural notification upon the evacuation control

Upon the detection of the abnormal state of the driver at the time point t0, the calculation and the setting of the waiting time tst may be performed. In addition to the setting of the waiting time tst, for the inside of the vehicle, the provision of the visual alerting or the visual notification to the driver and the fellow passenger may be started as illustrated in FIG. 4C by means of, for example but not limited to, the display, the monitor, or the alarm lamp. The aural alerting or the aural notification may also be provided to the driver and the fellow passenger as illustrated in FIG. 4D by means of for example but not limited to, the previously-recorded voice. For the outside of the vehicle, the aural alerting or the aural notification may be provided to the surrounding vehicles and the passersby as illustrated in FIG. 4D by means of, for example but not limited to, the previously-recorded voice.

Note that, although unillustrated in the time charts of FIGS. 4A to 4D, the priority is given to the override input performed by the driver when the override input is performed during the waiting time tst.

Upon the elapse of the waiting time tst, i.e., satisfaction of the time point t1, the evacuation traveling may be started that guides the vehicle to the evacuation position. The starting of the evacuation traveling may result in a gradual decrease of the vehicle speed V as illustrated in FIG. 4A and automatic steering to the evacuation position as illustrated in FIG. 4B. Note that, although unillustrated in the time charts of FIGS. 4A to 4D, the evacuation traveling may be executed by giving the priority to the evacuation traveling even when the override input is performed by the driver once the evacuation traveling is started. This makes it possible to prevent unstable steering and traveling performed by the driver from being carried out under a situation where the driver is unable to make a normal determination, and thereby to improve safety.

Further, from the time point t1, the provision of the visual alerting or the visual notification to the surrounding vehicles and the passersby outside the vehicle may be started as illustrated in FIG. 4C by means of, for example but not limited to, the hazard lights.

When the vehicle reaches and thus stops at the evacuation position and the evacuation traveling completes, i.e., upon satisfaction of the time point t3, the provision of the aural alerting or the aural notification performed on the inside and the outside of the vehicle may be ended as illustrated in FIG. 4D.

According to one implementation of the technology, the detection of the abnormal state of the driver upon the automatic driving control or the non-automatic driving control of the vehicle may allow for the transition to the evacuation control. In the evacuation control, the waiting time tst until the starting of the evacuation traveling may be calculated first, at least based on the level of consciousness of the driver. After the elapse of the waiting time tst, the evacuation traveling may be executed. Upon execution of the evacuation control, the priority may be given to the override input performed by the driver when the override input is performed during the waiting time tst from the detection of the abnormal state of the driver to the starting of the evacuation traveling. When the override input is performed by the driver from the starting of the evacuation traveling following the elapse of the waiting time tst, the evacuation traveling may be executed by giving the priority to the evacuation traveling over the override input. Hence, even when a member that detects the abnormal state of the driver, including a switch and a sensor without limitation, erroneously detects the abnormality of the driver, it is possible to prevent an immediate transition to the evacuation traveling by virtue of the waiting time tst, and thereby to prevent execution of unnecessary evacuation traveling. Further, the priority may be given to the override input performed by the driver only during the waiting time tst from the detection of the abnormal state of the driver to the starting of the evacuation traveling. Following the starting of the evacuation traveling, the priority may be given to the evacuation traveling over the override input performed by the driver. Hence, it is possible to prevent unstable steering and traveling performed by the driver from being carried out under a situation where the driver is unable to make a normal determination, and thereby to perform the proper evacuation traveling that takes the state of the driver into consideration.

Although some implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle traveling control apparatus, comprising:
   a surrounding environment recognizer that obtains information on a traveling environment of an own vehicle as a traveling environment information;
   a vehicle position information detector that obtains information on traveling of the own vehicle as a traveling information;
   a traveling controller that performs an evacuation traveling control, based on the traveling environment information and the traveling information, the evacuation traveling control causing an evacuation traveling of the own vehicle to be executed;
   a detector that detects an abnormal state of a driver of the own vehicle; and
   a calculator that calculates a waiting time so as to turn down the waiting time according to whether the own vehicle performs automatic driving when the abnormal state of the driver is detected by the detector, the waiting time during which waiting is performed from the detection of the abnormal state of the driver to starting of the evacuation traveling control.

2. The vehicle traveling control apparatus according to claim 1, wherein the detector detects the abnormal state of the driver, at least based on a level of consciousness of the driver, and the calculator adjusts a length of the waiting time, at least based on the level of consciousness of the driver.

3. The vehicle traveling control apparatus according to claim 2, wherein, when the own vehicle performs non-automatic driving, the calculator adjusts the length of the waiting time, using at least the level of consciousness of the driver, the traveling environment information, reliability of the traveling environment information, and the traveling information.

4. The vehicle traveling control apparatus according to claim 3, wherein the traveling controller executes a traveling control that is based on an override input performed by the driver by giving priority to the traveling control, when the override input is performed during the waiting time.

5. The vehicle traveling control apparatus according to claim 3, wherein the traveling controller executes the evacuation traveling control by giving priority to the evacuation traveling control over a traveling control that is based on an override input performed by the driver, when the override input is performed from the starting of the evacuation traveling control following elapse of the waiting time.

6. The vehicle traveling control apparatus according to claim 3, further comprising a first notifier that performs a first notification from the detection of the abnormal state of the driver, the first notification visually notifying, inside of the own vehicle, of information on the evacuation traveling.

7. The vehicle traveling control apparatus according to claim 3, further comprising a second notifier that performs a second notification from the starting of the evacuation traveling control, the second notification visually notifying, outside of the own vehicle, of information on the evacuation traveling.

8. The vehicle traveling control apparatus according to claim 3, further comprising a third notifier that performs a third notification from the detection of the abnormal state of the driver, the third notification being aural notification of information on the evacuation traveling.

9. The vehicle traveling control apparatus according to claim 2, wherein the traveling controller executes a traveling control that is based on an override input performed by the driver by giving priority to the traveling control, when the override input is performed during the waiting time.

10. The vehicle traveling control apparatus according to claim 2, wherein the traveling controller executes the evacuation traveling control by giving priority to the evacuation traveling control over a traveling control that is based on an override input performed by the driver, when the override input is performed from the starting of the evacuation traveling control following elapse of the waiting time.

11. The vehicle traveling control apparatus according to claim 2, further comprising a first notifier that performs a first notification from the detection of the abnormal state of the driver, the first notification visually notifying, inside of the own vehicle, of information on the evacuation traveling.

12. The vehicle traveling control apparatus according to claim 2, further comprising a second notifier that performs a second notification from the starting of the evacuation traveling control, the second notification visually notifying, outside of the own vehicle, of information on the evacuation traveling.

13. The vehicle traveling control apparatus according to claim 2, further comprising a third notifier that performs a third notification from the detection of the abnormal state of the driver, the third notification being aural notification of information on the evacuation traveling.

14. The vehicle traveling control apparatus according to claim 1, wherein the traveling controller executes a traveling control that is based on an override input performed by the driver by giving priority to the traveling control, when the override input is performed during the waiting time.

15. The vehicle traveling control apparatus according to claim 1, wherein the traveling controller executes the evacuation traveling control by giving priority to the evacuation traveling control over a traveling control that is based on an override input performed by the driver, when the override input is performed from the starting of the evacuation traveling control following elapse of the waiting time.

16. The vehicle traveling control apparatus according to claim 1, further comprising a first notifier that performs a first notification from the detection of the abnormal state of the driver, the first notification visually notifying, inside of the own vehicle, of information on the evacuation traveling.

17. The vehicle traveling control apparatus according to claim 1, further comprising a second notifier that performs a second notification from the starting of the evacuation traveling control, the second notification visually notifying, outside of the own vehicle, of information on the evacuation traveling.

18. The vehicle traveling control apparatus according to claim 1, further comprising a third notifier that performs a third notification from the detection of the abnormal state of the driver, the third notification being aural notification of information on the evacuation traveling.

* * * * *